(12) United States Patent
Calhoun

(10) Patent No.: US 7,411,865 B2
(45) Date of Patent: Aug. 12, 2008

(54) SYSTEM AND METHOD FOR ARCHIVING DATA FROM A SENSOR ARRAY

(75) Inventor: Robert B. Calhoun, Oberlin, OH (US)

(73) Assignee: Shotspotter, Inc., Mountain View, CA (US)

( * ) Notice: Subject to any disclaimer, the term of this patent is extended or adjusted under 35 U.S.C. 154(b) by 6 days.

(21) Appl. No.: 11/318,422

(22) Filed: Dec. 23, 2005

(65) Prior Publication Data

US 2007/0230270 A1     Oct. 4, 2007

Related U.S. Application Data

(60) Provisional application No. 60/638,876, filed on Dec. 23, 2004.

(51) Int. Cl.
*G01S 3/808* (2006.01)

(52) U.S. Cl. ...................... 367/124; 367/127

(58) Field of Classification Search .......... 367/906, 367/124, 127, 129; 707/1
See application file for complete search history.

(56) References Cited

U.S. PATENT DOCUMENTS

| | | | | |
|---|---|---|---|---|
| 5,586,086 A | * | 12/1996 | Permuy et al. | 367/906 |
| 5,973,998 A | * | 10/1999 | Showen et al. | 367/906 |
| 6,178,141 B1 | * | 1/2001 | Duckworth et al. | 367/906 |
| 2002/0003470 A1 | * | 1/2002 | Auerbach | 340/425.5 |
| 2004/0100868 A1 | * | 5/2004 | Patterson et al. | 367/127 |
| 2005/0237186 A1 | * | 10/2005 | Fisher et al. | 340/539.22 |
| 2006/0114749 A1 | * | 6/2006 | Baxter et al. | 367/128 |
| 2006/0161339 A1 | * | 7/2006 | Holmes et al. | 701/207 |
| 2006/0256660 A1 | * | 11/2006 | Berger | 367/124 |
| 2006/0280033 A1 | * | 12/2006 | Baxter et al. | 367/906 |
| 2006/0294164 A1 | * | 12/2006 | Armangau et al. | 707/205 |

* cited by examiner

*Primary Examiner*—Dan Pihulic
(74) *Attorney, Agent, or Firm*—DLA Piper US LLP

(57) ABSTRACT

A system and method for archiving and retrieving information from an array of remote sensors. In a preferred embodiment the invention is incorporated in a gunshot detection and location system to preserve audio information surrounding a gunshot event for later review or analysis. In a preferred embodiment the system includes a plurality of acoustic sensors deployed in an array, a computer for processing gunshot information from the sensors, and a mass storage device for temporary archival of audio information. When a gunshot event is detected, the location of the audio information of the data within the spool is stored in an index to facilitate later retrieval of the information.

21 Claims, 8 Drawing Sheets

SYSTEM AND METHOD FOR ARCHIVING DATA FROM A SENSOR ARRAY

CROSS REFERENCE TO RELATED APPLICATION

This application claims benefit of provisional patent application No. 60/638,871 filed Dec. 23, 2004.

BACKGROUND OF THE INVENTION

1. Field of the Invention

The present invention relates to a system and method for archiving data from a sensor array along with metadata that facilitates later retrieval of the archived data. More particularly, but not by way of limitation, in a system for identifying and locating an acoustic event, the present invention provides a system and method for collecting, storing, and indexing raw data from detected events for efficient subsequent review.

2. Background of the Invention

Gunfire and sniper detection systems are generally known in the art. Such systems can be broadly grouped into three categories: systems which pinpoint the precise location of the source of gunfire; azimuthal sensors which provide an indication of the radial direction to the source of gunfire; and proximity sensors which merely provide an indication that nearby gunfire was detected. While such systems have been demonstrated to perform well in both law enforcement and military applications, the entire field is presently an emerging technology.

In many large cities, gun-related violence has become a plague of epidemic proportions. Urban gunfire, whether crime-related or celebratory in nature, results in thousands of deaths per year in the United States alone. Gunfire location systems, such as those installed in the Redwood City, Calif., Glendale, Ariz., Willowbrook, Calif., City of Industry, Calif., and Charleston, S.C. areas, have proven to be effective in reducing law enforcement response time to detected gunfire, apprehending criminals, collecting evidence, and reducing the occurrence of celebratory gunfire. One such system is described in U.S. Pat. No. 5,973,998, issued to Showen, et al., which is incorporated herein by reference.

Showen, et al., discloses a system wherein sensors are placed at a density of roughly six to ten sensors per square mile. Audio information is sent to a computer at a central location and processed to: detect a gunshot; determine a time of arrival for the gunshot at each sensor; and calculate a location of the shooter from the difference in the times of arrival at three or more sensors. Showen, et al. takes advantage of the long propagation distance of gunfire to place sensors in a relatively sparse array so that only a few of the sensors can detect the gunfire. This permits the processor to ignore impulsive events which only reach one sensor—a concept called "spatial filtering." This concept of spatial filtering radically reduces the sensor density compared to predecessor systems, which require as many as 80 sensors per square mile.

Another gunshot location system is described in U.S. Pat. No. 6,847,587 issued to Patterson, et al., which is incorporated herein by reference. Patterson, et al. discloses a system wherein audio information is processed within each sensor to detect a gunshot and determine a time of arrival at the sensor. Time of arrival information, as determined from a synchronized clock, is then transmitted wirelessly by each sensor to a computer at a centralized location where a location of the shooter is calculated in the same manner as in the Showen, et al. system.

As yet, azimuthal systems have not been as widely accepted as, for example, the Showen, et al. system. Azimuthal sensors typically employ one or more closely-spaced sensors, where each sensor includes several microphones arranged in a small geometric array. A radial direction can be determined by measuring the differences in arrival times at the various microphones at a particular sensor. Presently such systems suffer from somewhat limited accuracy in the determination of the radial angle. When two or more azimuthal sensors are used to locate a source location by finding the intersection of indicated radial angles, angular error translates into positional error. Since errors in the radial angle result in ever increasing positional error as the distance from the sensor to the source increases, the reported position will be especially suspect toward the outer limits of the sensor's range.

While present gunshot detection systems provide nearly immediate information about an event, it has heretofore been overlooked that the audio data surrounding the event may provide investigative leads or be rich in evidentiary value. For example, the raw audio data might be used by an expert in weapon types to identify the specific model of weapon used, or by an automotive expert to gain information about the type of car used in a drive-by shooting. Further, it has also been overlooked that, if the audio data is stored along with time information, the data from mislocated, or unlocated, events can be later processed to determine a correct source location, and an exact time at which the event occurred.

Past inventions also do not allow the use of audio information to test the veracity of a witness. For example, a person may claim to have been shot in an area near a sensor at a time when an automated gunshot location system did not report any gunfire. This could be because of a failure of the gunshot location system or it could be because of inaccuracies in the story of the witness. To determine the truth of the situation, the data collected by the system could be rescanned over the period of interest to ensure that no gunshots were detected on any channel during this time.

Even if a time frame is narrowed down to an hour, or so, the task of reviewing data from each sensor of an array, would be daunting. Searching an hour of data from a sixteen sensor array would consume two man work days. Further, if data is stored remote from the user, the time required to retrieve hour long audio files from a plurality of sensors would require large amounts of time. As it is thus infeasible for a user to download and listen to even fairly short time periods of data across multiple sensor channels in a timely manner, there is a need for a method to facilitate the review of large amounts of remotely stored data.

It is thus an object of the present invention to provide a system and method for storing data from a sensor array which overcomes the problems and alleviates the needs discussed above.

SUMMARY OF THE INVENTION

The present invention provides a system and method for storing data from an array of remote sensors. In a preferred embodiment, the inventive system includes: a plurality of acoustic sensors dispersed throughout a monitored area; a communication network adapted to deliver information from the sensors to a host processor; and a storage system for storing acoustic information received at each sensor.

In another preferred embodiment, the inventive system includes: a plurality of acoustic sensors for receiving acoustic information from a monitored area; and a processor for discriminating acoustic events from other sounds. Upon detecting an acoustic event, the type of event and the precise time of arrival of the event are determined and acoustic data surrounding each detected event is stored in digital form and indexed such that the information may be easily retrieved at a later time. For example, the characteristics of each gunshot-like sound detected (its amplitude, the shape of its envelope, its frequency components, etc) may be stored along with the arrival time as audio metadata in a database such that data files may easily be searched with conventional database searching algorithms. By storing the absolute timing information for the audio data on each channel, the relative timing information from multiple channels may be ascertained with high precision.

The invention is not limited to the field of audio data recording or gunshot detection. For example, a remote sensor with data logging capability and a low-bandwidth radio telemetry link might be assigned to monitor the temperature of a process. Using the present invention, a message containing the time, temperature, fluid flow rates, etc. could be sent to a remote database every time some warning threshold (temperature or rate of temperature change, for example). Later, the temperature might exceed a certain alarm threshold, causing the sensor to send an alarm via radio telemetry to indicate a serious problem with the process. By storing the metadata for all measurements in a database, including those that do not trigger an alarm, an engineer later desiring to review the relevant data stream stored on the sensor can readily determine when the process began to have problems and extract the raw data from data point.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
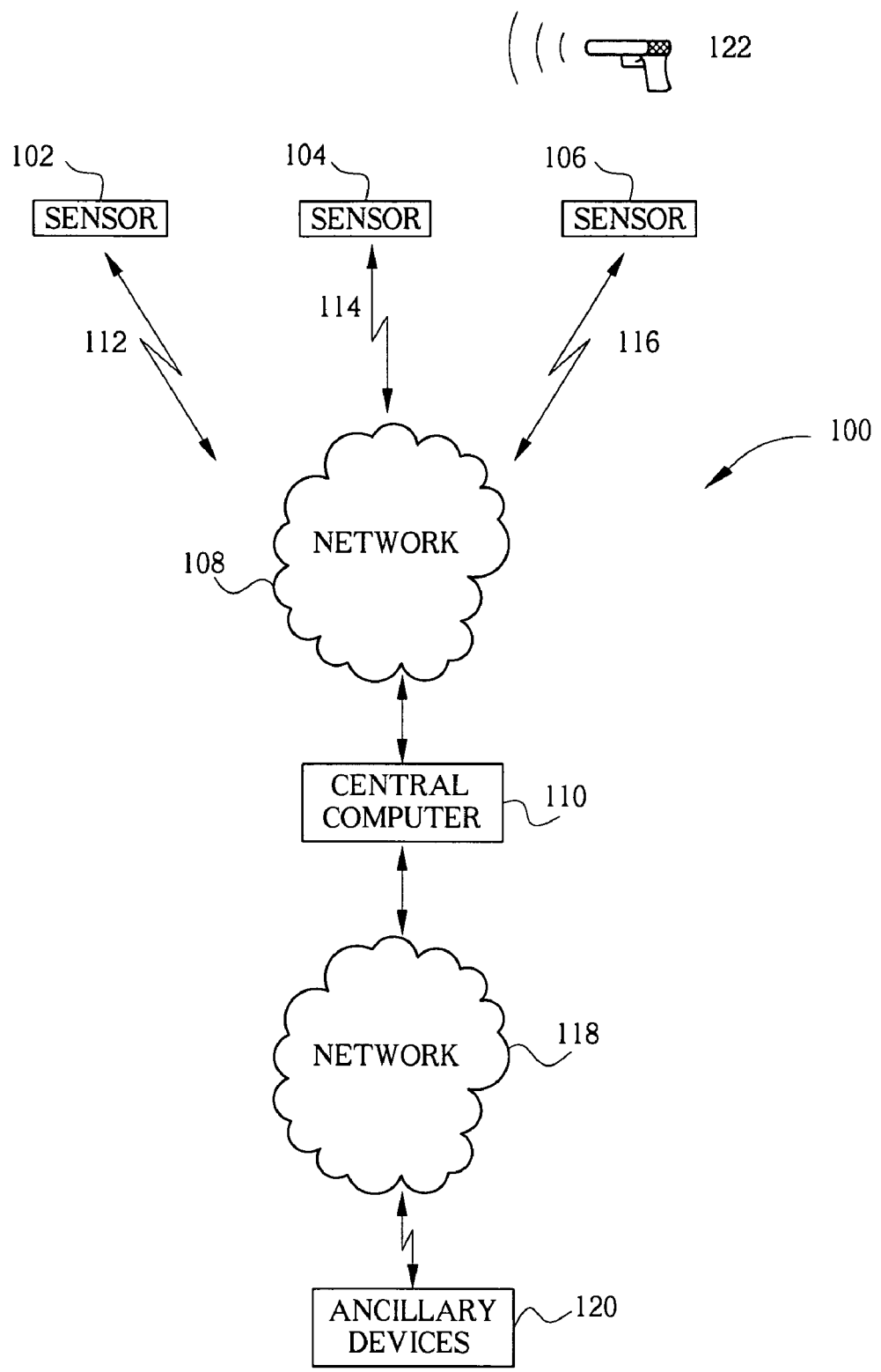
FIG. 1 depicts a preferred configuration of a gunshot detection system in which the inventive method is used.

Referring now to the drawings, wherein like reference numerals indicate the same parts throughout the several views, a representative gunshot detection system 100 is shown in its general environment in FIG. 1. In a preferred embodiment, a plurality of sensors 102-106 are dispersed over a monitored area. Preferably, each sensor is placed such that it has a relatively unobstructed acoustic view around its immediate area. By way of example and not limitation, suitable sites include: placed atop a building; placed atop utility or light poles; on towers, etc. Typically sensors 102-106 communicate through a communications network 108 with a centralized processor 110 wherein information concerning acoustic events is processed to provide details of the event, such as the source location of a gunshot, time of the gunshot, the number of detected gunshots, the type of event, and the like. It should be noted that sensors 102-106 may be any combination of wired or wireless sensors, that communications paths 112-116 may carry either analog or digital information, and that network 108 may comprise any combination of sub-networks, such as, by way of example and not limitation: a telephone network; the internet; a private computer network; or even a collection of dedicated wires routed to the sensor array.

As will be appreciated by those skilled in the art, information about a detected acoustic event is typically output to a person of interest such as a police dispatcher or directly to individual officers, as through network 118 to display devices 120 or a computer console. When weapon 122 is fired, the muzzle blast reaches sensors 102-106 at different times based on the speed of sound and the distance of each sensor from the shooter. Whether the acoustic information is processed at the sensor, or at computer 110, a time of arrival is determined for each sensor and the differences between the various times of arrival are processed to determine a location of the source of the gunshot. In response to the gunshot, information is provided at device 120.

Figure 2:
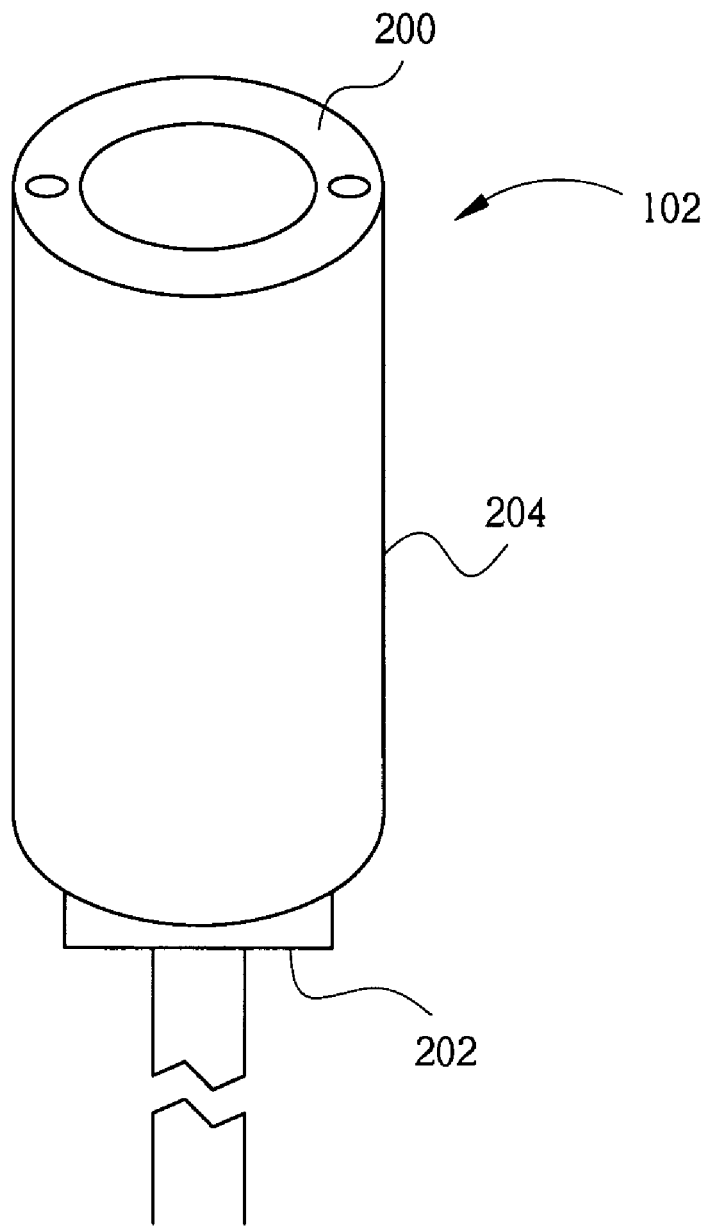
FIG. 2 provides a perspective view of a preferred embodiment of a sensor as employed in the inventive system.

A preferred embodiment of a sensor 102 is shown in FIG. 2. Typically sensor 102 includes a housing 200, a support 202 for mounting sensor 102, and a windscreen 204 for protecting internal elements from the environment, while allowing acoustic waves to pass through to the interior.

Figure 3:
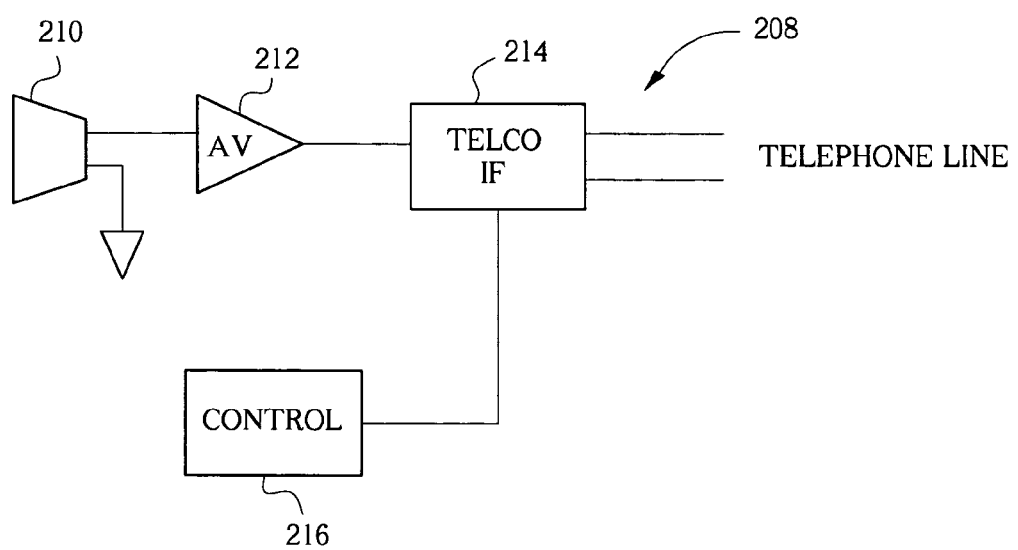
FIG. 3 provides a block diagram for a preferred embodiment of an analog wired sensor.

Turning to FIG. 3, preferably a wired analog sensor 208 includes: a microphone 210; an amplifier, and/or other signal conditioning, 212; an interface to a communication network 214, most preferably a telephone network; and control logic 216 to handle administrative tasks such as hook-switch. Optionally, sensor 208 may include other features such as, by way of example and not limitation: temperature sensing; gain control; phone line integrity monitoring; etc. In a system employing at least one wired sensor 208, audio information is transmitted via communication network 215 to a central location where the audio information is digitized and processed to detect gunshots and determine a source location. It should be noted that a particular advantage of the wired analog sensor is that sensor circuitry may be powered by the loop current provided through the telephone line.

Figure 4:
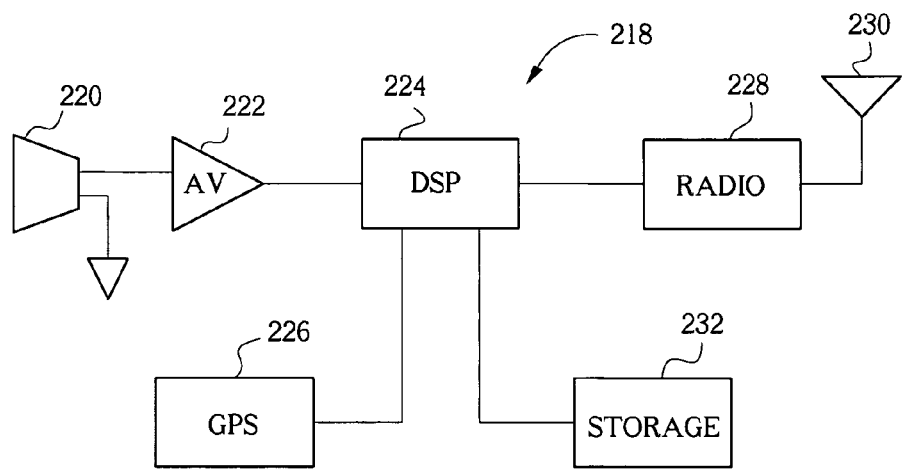
FIG. 4 provides a block diagram for a preferred embodiment of a wireless sensor.

With reference to FIG. 4, a preferred embodiment of a wireless sensor 218 includes: a microphone 220 for receiving acoustic information; an amplifier and/or other signal conditioning 222; a processor 224, typically a digital signal processor ("DSP"), as are well known in the art; a satellite positioning receiver, e.g. a GPS 226; a radio 228 configured for wireless transmission and reception of digital signals; and antenna 230. It should be noted that in such a sensor, GPS receiver 226 may play two roles, providing positional information as to the sensor's location and an exceptionally accurate real time clock. In one preferred embodiment, DSP 224 processes the received audio information to detect a gunshot and determine the time of arrival of the gunshot. As will be appreciated by those skilled in the art, since only the sensor location and time of arrival need to be transmitted to another location, the load placed on a wireless network by a single sensor 218 may be relatively small. With regard to the present invention, as discussed in more detail hereinbelow, it is most preferable that sensor 208 also includes mass storage device 232 for temporary archival of audio data. For purposes of this invention a "mass storage device" is a device for storage of digital information. By way of example and not limitation mass storage devices include: magnetic disk drives; optical disk drives; CD-ROM drives; DVD drives; flash storage devices such as memory sticks, CF cards, SD cards, MMX cards, and the like; floppy disk drives; as well as any other file oriented type storage device.

Figure 5:
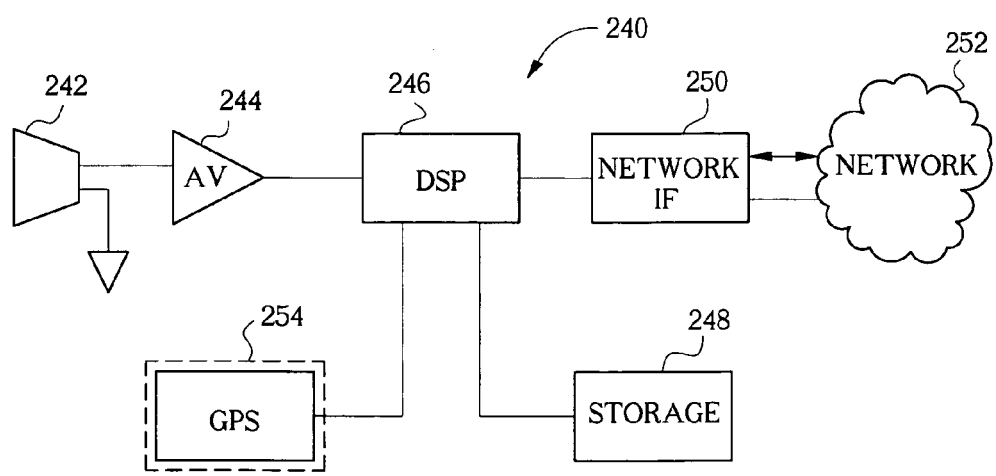
FIG. 5 provides a block diagram for a preferred embodiment of a digital wired sensor.

Turning next to FIG. 5, wherein is shown a preferred embodiment of a wired digital sensor 240. Sensor 240 preferably includes: microphone 242; amplifier and/or other signal conditioning 244; a processor 246, preferably a digital signal processor; a network interface 250 for communication via a digital network 252, such as by way of example and not limitation, an Ethernet. Like the wireless sensor, in the preferred embodiment of the wired digital sensor processing of the received audio is performed at the sensor and mass storage device 248 is provided for temporary storage of the audio signal.

Optionally, the wired digital sensor may also include a GPS receiver 254, however as will be apparent to those skilled in the art, a wired sensor does not have the same need to self-survey as exists with a wireless sensor. Further, while GPS receiver 254 may be used to provide synchronized clocks among an array of sensors, adequate synchronization may be achieved by periodically synchronizing sensor clocks via the network, or by acquiring data from all sensors using a data acquisition system in which a common sample clock is used to drive acquisition on each sensor.

Figure 6:
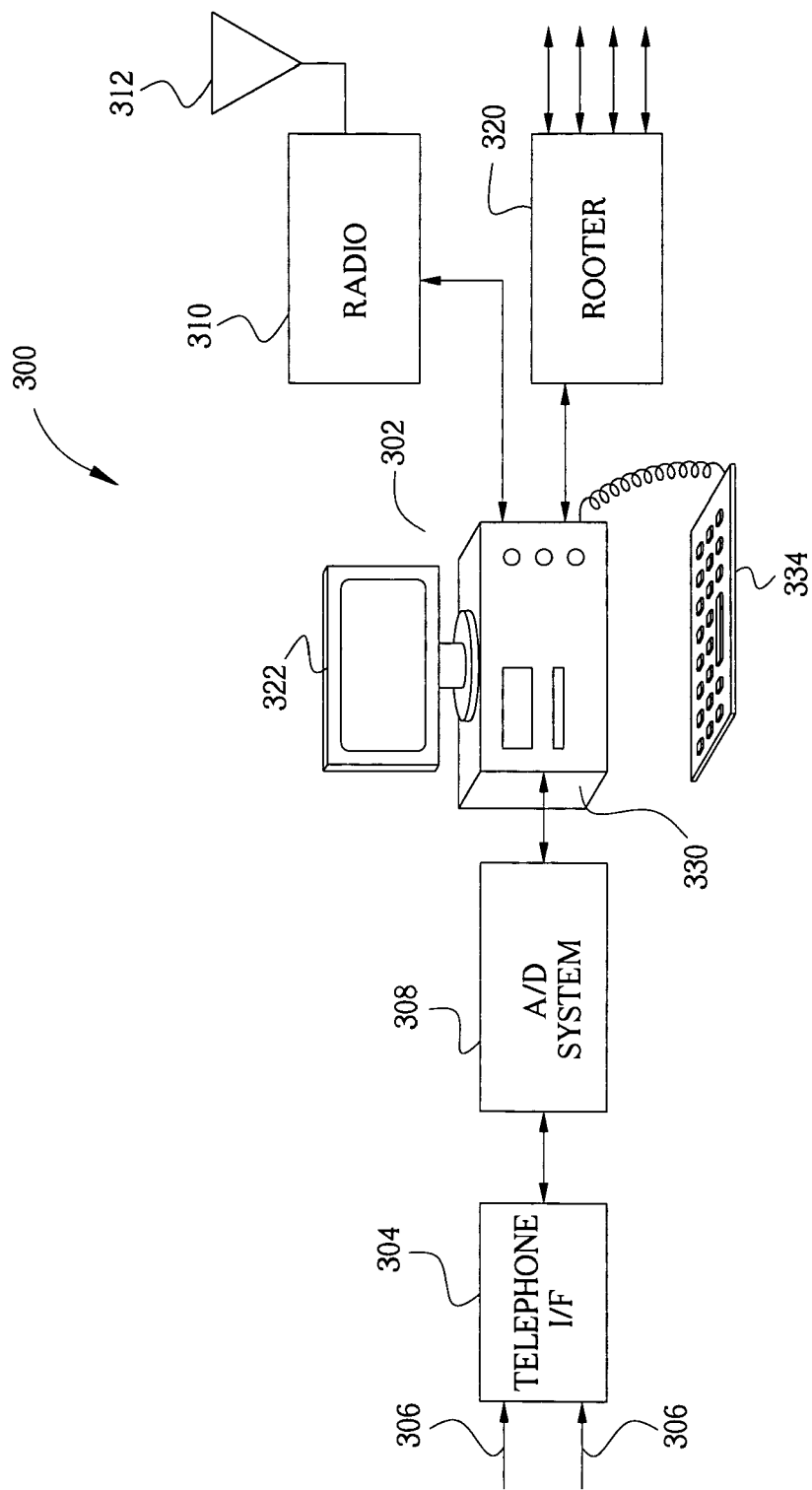
FIG. 6 provides a block diagram of the server of FIG. 6 when used to collect information from an array of sensors.

With presently known gunshot detection systems, it is not possible to provide an accurate position of the shooter with a single sensor. As a result, the calculation of a shooter position requires computation based on the outputs of a plurality of sensors. In a preferred embodiment the sensors communicate with a computer or server 300 as shown in FIG. 6. Server 300 preferably comprises: CPU 302; when employed in a system having wired analog sensors, a telephone interface 304 supporting connection to a plurality of phone lines 306, typically one line for each wired analog sensor and analog to digital converter 308 providing at least one analog input channel for each incoming telephone line; when employed in a system having one or more wireless sensors, radio base station 310 and antenna 312; and, when employed in a system having one or more wired digital sensors, router 320.

As will be apparent to those skilled in the art, CPU 302 will usually include: an enclosure 330 housing the circuitry of the CPU, one or more disk drives for the nonvolatile storage of programs and data, as well as a host of commonly found features, such as a sound card, printer ports, serial ports, USB ports, a network interface, IEE-1394 ports, etc.; a monitor 332; and keyboard 334.

In practice, audio signals received from telephone lines 306 are digitized at a predetermined rate through A/D system 308. As will be appreciated by those familiar with the switched telephone network, audio which passes through the switched system is bandwidth limited to approximately 3000 Hz. Thus, a sample rate of 12 kHz at A/D 308 is more than adequate to record any details of the signal which have passed through the telephone line.

The digitized audio is then stored in a relatively short buffer and processed to determine: if a gunshot occurred; and, if so, a time of arrival of the gunshot. Techniques for making such determinations are well known in the art. If shots are received at a sufficient number of sensors, the differences in the times of arrivals are used to determine a source location of the gunshot.

When wireless or wired digital sensors are used, the gunshot detection and the time of arrival calculation are preferably performed at the sensor, rather than at CPU 302. The calculation of the source location based on differences in the times of arrival, however, is still preferably performed at CPU 302.

It has been observed that, even though in the preferred embodiment the sensors are widely separated, often other sounds made by perpetrators are received at a sensor and could provide investigative leads or have independent evidentiary value. It is, of course, impractical to attempt to listen to all of the audio received from all of the sensors and such an attempt would waste valuable manpower resources. Further, where digital sensors are used, the audio is not sent to CPU 302 as part of the detection process and, sending continuous audio to CPU 302 from every digital sensor would waste bandwidth of the network.

A practical solution is to save all of the audio from each sensor to nonvolatile memory, for example a hard drive, for a predetermined period of time. To reduce storage requirement, stale data is deleted as new data is stored. In one preferred embodiment audio information is stored for 72 hours. If a crime involving gunfire occurs on a Friday night, detectives can review audio surrounding the event on Monday morning and create a copy of any audio which may be of interest, thus avoiding the pending deletion of the data. In addition, the system may be programmed to provide "hints" as to the location of audio events which may not have produced a source location, perhaps because of environmental conditions, but which might be manually analyzed to determine the source location after the fact.

With further reference to FIGS. 3, 4, and 5, at CPU 302, in the case of wired analog sensors, bandwidth is not an issue since analog audio is sent to CPU 302 over a dedicated pair of wires for each sensor. In the case of digital sensors 218 or 240, however, attempting to return all of the audio from all of the sensors would likely tax the throughput of the network. Instead, the audio is stored locally along with such information as the position of the sensor, the temperature of the air, etc. at the sensor and only the hints and event information, known as metadata, are sent to, and stored at, CPU 302. When audio is reviewed, only the desired time from the desired sensors is actually transferred over the network.

The utility of computing this metadata in real time and storing it in a local or remote database becomes apparent when the raw data itself is stored at a remote site accessible only via a low-bandwidth communications link, as is typically the case with all remote sensors that use radio telemetry. Since the vast majority of the data stored remotely is of little or no interest, the desired information can be much more expeditiously obtained by searching the database of metadata to reveal those subsets of data which are most likely to be of interest. As will be apparent to those skilled in the art, when digital sensors are employed, this metadata can be stored locally in the sensor or at the host computer.

Also, in the case of wired sensors, providing sufficient disk space at CPU 302 to store 72 hours of audio from even dozens of wired analog sensors 208 is of little concern. At sensors 218 and 240, however, power consumption and size are important factors. In one preferred embodiment, audio data is stored on commonly available flash media such as SD cards, CF cards, MMX cards, USB memory device, or the like. As will be apparent to those skilled in the art, such mass storage devices are available which mimic a hard drive and provide significant amounts of storage.

In one preferred method of storing the audio data, a directory structure is written to the disk such that there is a dedicated directory for each month of the year. In each month directory there are subdirectories for each day of the month. In each day directory there are twenty four subdirectories, one for each hour of the day. Each hour directory contains sixty minute-subdirectories, and in each minute-subdirectory there are sixty second-subdirectories. At the beginning of each hour CPU 302 erases the data in the appropriate directory representing 72 hours in the past, while at the end of each second the CPU writes audio from that second in its appropriate directory. Each file contains one second of audio and the file names of all such files are generated from the sensor identifier and from the absolute time of that second. In this method, the directory structure provides the indexing to retrieve the desired audio from any start time to any stop time.

An index file is also produced having the times for every event detected by the system, as well as the times of other sounds which may be of interest (the hints). Thus, audio may also be retrieved relative to an event. This requires only one level of indirection, looking up the time of the event from the index file.

While the above described method is well-suited for CPU 302, it is somewhat problematic for sensors 218 and 240. In order to minimize the amount of storage required at the sensor, it is important that the audio information is stored in a manner which makes full use of the drive, in light of its file structure. For example, the file structure of the drive may group sixty four, 512 byte sectors into a cluster such that each cluster contains 32,768 bytes. Files stored in such a file system thus consume disk space in 32 kilobyte chunks. If a digital sensor is sampling audio at 40,000 samples per second where each sample uses two bytes, each second requires 80,000 bytes of storage, which, in turn requires three clusters, or 98,304 bytes. If this storage system is used without adjustment, 18,304 bytes per second of disk space would be wasted. Instead, each minute is subdivided into periods of time which make virtually full use of the drive. Conversion of time in seconds to the period employed in the sensor may be performed either at CPU 302 or at the sensors 218 or 240, in a manner which is transparent to the person requesting the data.

Yet another issue which arises with regard to distributed storage with digital sensors 218 and 240 is the possibility of compressing the data to make best use of the disk space. As will be apparent to those skilled in the art, compression schemes can be broadly divided into two classes: lossy schemes and non-lossy schemes. Lossy schemes compress audio in such a way that decompressed audio will faithfully reproduce the original sound but the actual reconstructed waveform may not be identical to the original. In contrast, non-lossy schemes exactly reconstruct the original waveform. While non-lossy schemes are always acceptable for use with the present invention, the manner in which the data may be used requires that a lossy scheme faithfully reproduce impulsive events without imparting variable delay and that the modification of the data will not impact its effectiveness as evidence in a court of law.

In a preferred embodiment, audio information received at microphone 220 or 242 is converted into digital information by a twelve bit A/ID converter integrated into DSP 224 or 246. One non-lossy scheme takes advantage of the fact that, since data is stored in a byte-wide fashion, two samples can be compressed to occupy three bytes, as opposed to four bytes. To reconstruct the original waveform, the middle byte is simply split in half with one sample claiming the upper nibble and the other sample claiming the lower nibble. There are numerous non-lossy compression techniques which are well known in the art and suitable for use with the present inventive method.

Figure 7:
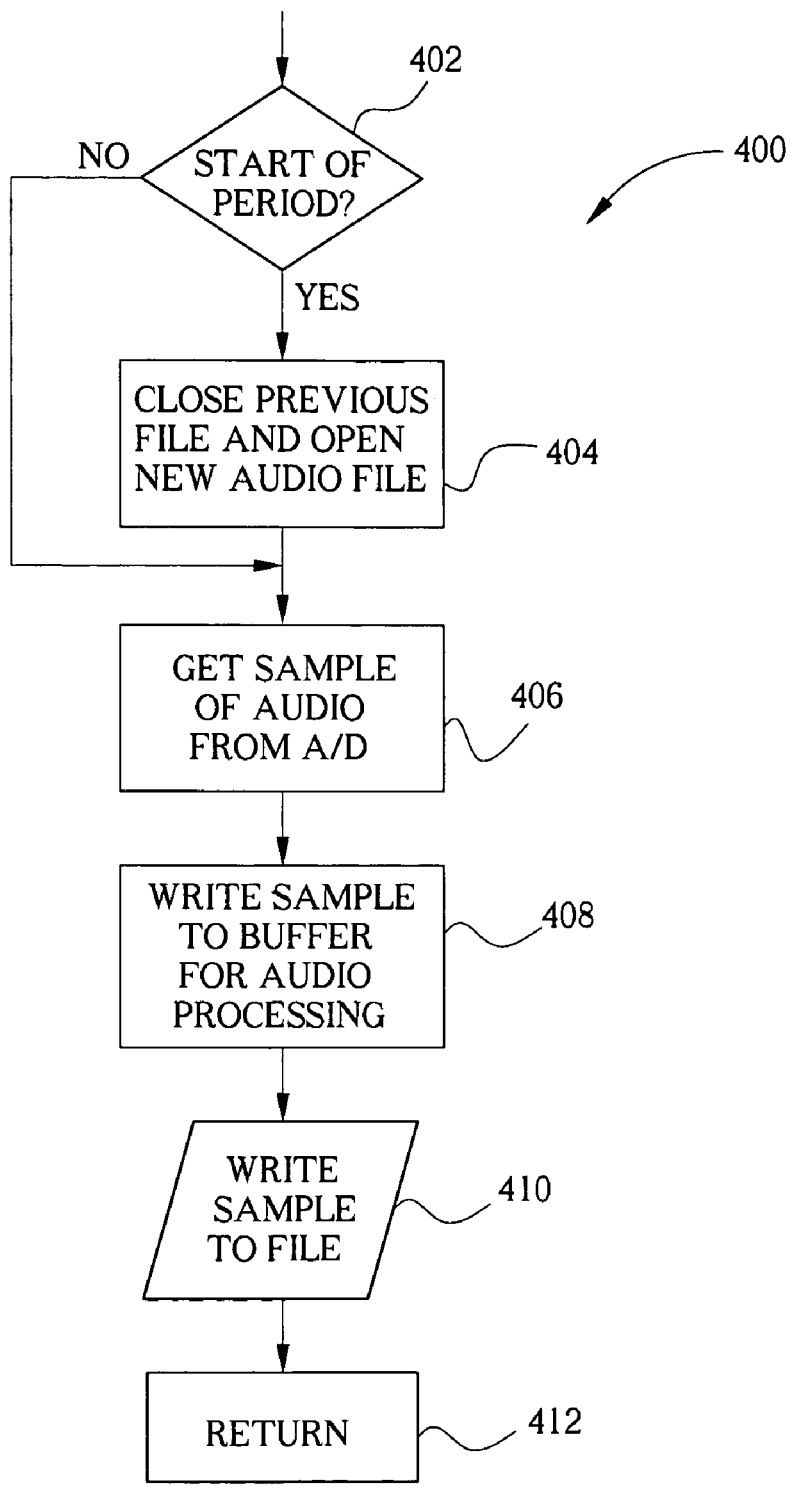
FIG. 7 provides a flow chart for a preferred method for storing audio information received at the server of FIG. 6.

Referring to FIG. 7, to save audio from an analog sensor to a hard drive of a server, a process 400 runs in communication with the periodic sampling of an audio signal. At step 402, if the interval to be stored is complete, the file for the previous interval is closed and the file for the next interval is opened in step 404. If a system of directories and subdirectories is employed as discussed hereinabove, the process of opening a file for the next interval would include the steps of building a path name based on the current time and date. At step 406, a new sample of digitized audio is input from the A/D system and written to a buffer for audio processing at step 408. At step 410, the sample is also written to the currently opened file before the process ends at step 412. As will be apparent to those skilled in the art, if the A/D system includes a provision for direct memory access, portions of process 400 may be performed by hardware.

Figure 8:
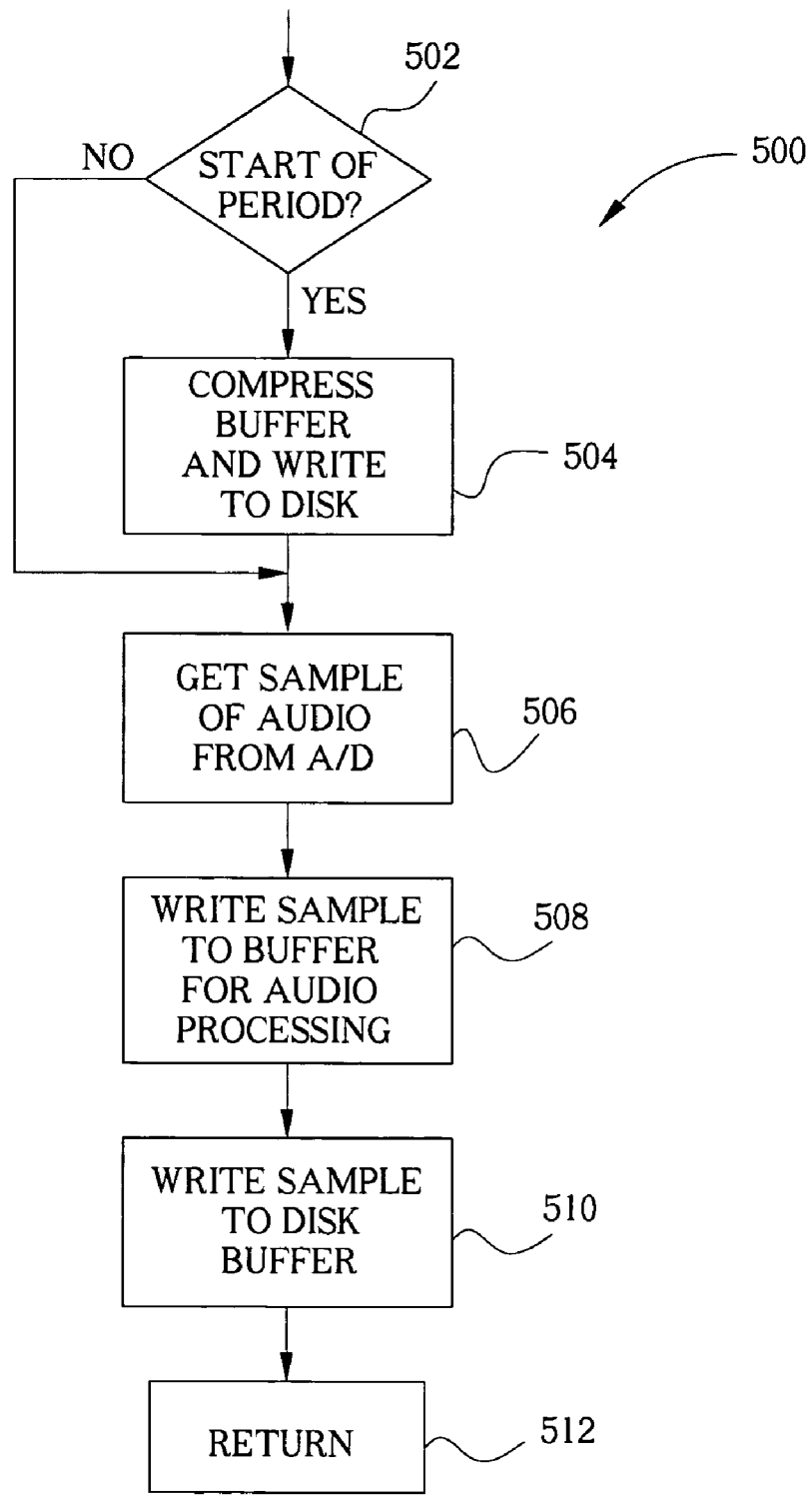
FIG. 8 provides a flow chart for a preferred method for storing audio information at a sensor.

Referring to FIG. 8, to save audio information at a digital sensor, a process 500 preferably runs in communication with an A/ID interrupt routine. Thus, at step 502, if a predetermined interval has passed, a file buffer is compressed, preferably in accordance with a non-lossy scheme, and written to a file at step 504. An audio sample is then input from the A/D converter at step 506 and saved in a buffer for processing the audio at step 508. The audio data is also saved to a file buffer at step 510 before process 500 ends at step 512. It should be noted that, if the processing of audio to detect an acoustic event does not modify the data, the buffers of step 510 and 512 may be the same buffer, and a single save operation may be sufficient.

Figure 9:
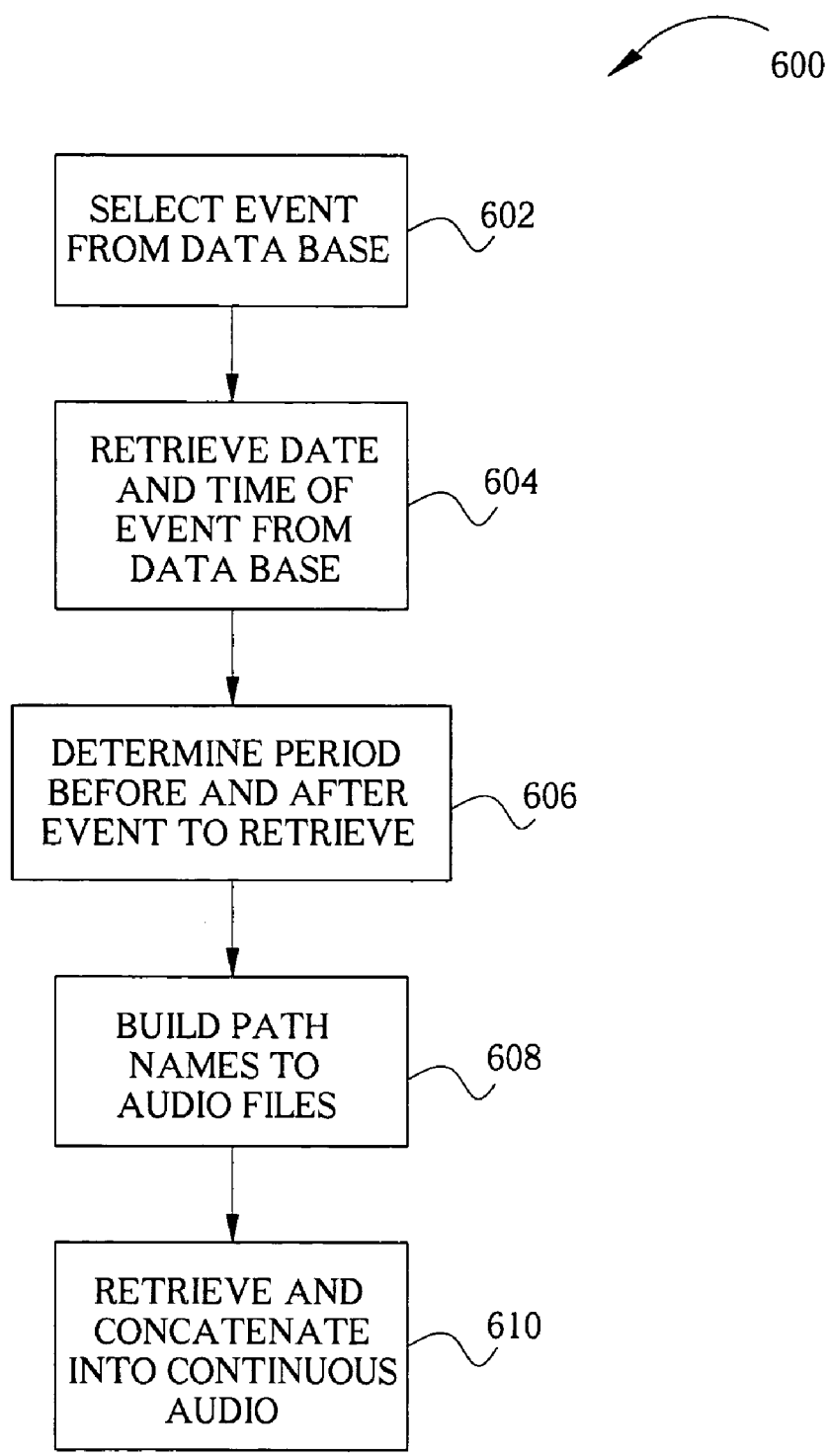
FIG. 9 provides a flow chart for a preferred method for using indexing information to retrieve audio data as stored in accordance with the method FIGS. 7 or 8.

Turning to FIG. 9, once audio information is saved in a file, preferably a system is in place to facilitate review of any portion of the audio information. As discussed above, the directory structure of the disk can be used to facilitate access based on one characteristic, such as time. Preferably the data may also be accessed through other characteristics which are stored in a data base. For example, process 600 describes a method for accessing an audio event where the type of event and the time and date of the event are stored in a data base. Beginning at step 602, a user first selects a particular event, preferably through a user interface with access to an event data base. In step 604, the system retrieves the data and time of the event from the data base. At step 606 the system gets the amount of time bracketing the event which the user wishes to review. At step 608, the pathnames are built for each audio segment to be retrieved and the audio is retrieved and concatenated into a single audio stream at step 610.

Since computer memory buffers and disk buffers are of finite size, it is necessary to store the data in a way that older data that is no longer of interest can be erased from the disk. Preferably, the data should be stored in a hierarchical file system organized by date so that obsolete files can most easily be found and erased by the recording system. Most preferably, each directory should be broken down into sub-directories by time so that the total number of files does not become too large and reduce the performance of the file system.

It should be noted that while preferred embodiments of the present invention have been described in connection with gunshot location systems, the spooling, archiving, logging of sensor metadata to a file or database, and other concepts described herein could be applied to many systems having large distributed data sets from disparate sources, such as those sensors monitoring temperature, pressure, strain, or concentration of certain chemicals. In particular it should be noted that the inventive method is particularly well suited to video data. Video transmission is even a greater consumer of network bandwidth than audio. Thus video could be archived remotely at, or near a camera, if an event is detected in the video, an index to the event may be stored and the information later transmitted for visual review of the event. In fact, in one preferred embodiment, a gunshot detection system is coupled to cameras which may be directed to pan, tilt, and zoom. When a gunshot is detected, cameras proximate the event are directed to the point indicated by the gunshot detection system. If video data is spooled to a mass storage device at or near the cameras, law enforcement personnel may use the stored index to quickly locate and retrieve the stored video from the remote location using minimal bandwidth.

As will also be apparent to those skilled in the art, the calculation of a shooter's position may be performed at one or more sensors and the index stored at any of the sensors involved in locating the gunshot event.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method for archiving audio information in a gunshot detection system of a type having array of acoustic sensors placed over a geographic area; wherein said array of sensors detects gunshots which occur proximate to the array, the method comprising the steps of:
providing a mass storage device;
periodically sampling an audio signal from each sensor;
detecting an impulsive noise event including a start time;
storing samples of audio data in said mass storage device wherein audio signals detected by each sensor can be selected using time data, wherein the audio signals may be reproduced with the relative timing between the audio signals of each sensor preserved; and
creating a searchable database wherein audio signals containing the impulsive noise event are indexed, with each audio signal being indexed as a function of a sensor that detected the audio signal and the start time.

2. The method for archiving audio information of claim 1 further comprising:
providing a file structure on said mass storage device, said file structure having a plurality of files, each file having an absolute time associated therewith.

3. The method for archiving audio information of claim 2 the samples of audio data are stored in a file having an appropriate absolute time associated therewith.

4. The method for archiving audio information of claim 3 wherein each file of said plurality of tiles represents one second of sampled audio.

5. The method for archiving audio information of claim 4 wherein said files representing one second of sampled audio are organized into minute directories, each minute directory having sixty said files representing one second of sampled audio.

6. The method for archiving audio information of claim 1 further including the step of
when a gunshot is detected, storing an index to the location of the stored samples in said mass storage device corresponding to said gunshot.

7. The method for archiving audio information of claim 6 further including the step of reproducing the audio surrounding said gunshot by using said index to locate said stored samples corresponding to said gunshot.

8. The method for archiving audio information of claim 1, wherein the audio signals are further indexed according to metadata so as to provide a metadata index.

9. The method for archiving audio information of claim 8, wherein the metadata index parses the searchable database into subsets which comprise impulsive noise events.

10. A method for archiving audio information in a gunshot detection system of a type having an array of acoustic sensors placed over a geographic area, wherein said array of sensors detects gunshots which occur proximate the array, the method comprising the steps of:
providing a mass storage device;
obtaining, from data storage elements on remote sensors, information indicative of audio signal samples that contain impulsive noise components;
creating a searchable database wherein the information is indexed as a function of a sensor and a time associated with capture of each audio signal;
processing data in the searchable database to identify an impulsive noise component or an audio signal sample of interest; and
downloading, from a remote sensor, audio data associated with the impulsive noise component or the audio signal sample of interest.

11. The method for archiving audio information of claim 10, wherein the information in the searchable database is further indexed according to metadata so as to provide a metadata index.

12. The method for archiving audio information of claim 11, wherein the metadata index parses the information in the searchable database into subsets of information which comprise impulsive noise components.

13. The method for archiving audio information of claim 10 further comprising providing a file structure on said mass storage device, said file structure having a plurality of files, each file having an absolute time associated therewith.

14. The method for archiving audio information of claim 13 the samples of audio data are stored in a file having an appropriate absolute time associated therewith.

15. The method for archiving audio information of claim 14 wherein each file of said plurality of files represents one second of sampled audio.

16. The method for archiving audio information of claim 10 further including the step of, when a gunshot is detected, storing an index to the location of the stored samples in said mass storage device corresponding to said gunshot.

17. The method for archiving audio information of claim 16 further including the step of reproducing the audio surrounding said gunshot by using said index to locate said stored samples corresponding to said gunshot.

18. The method for archiving audio information of claim 17, wherein a permanent recording is made of said later reproduction.

19. The method for archiving audio information of claim 10 further comprising identifying a non-gunshot event storing an index to the location of the stored samples in said mass storage device corresponding to said non-gunshot event.

20. The method for archiving audio information of claim 19 further including the step of reproducing the audio surrounding said non-gunshot event by using said index to locate said stored samples corresponding to said non-gunshot event.

21. The method for archiving audio information of claim 17, wherein determination of a source location of said gunshot event is performed from said later reproduction.

* * * * *